United States Patent [19]

Sebest et al.

[11] 3,742,683

[45] July 3, 1973

[54] OXYGEN PRODUCING UNIT WITH COOLED CASING

[75] Inventors: Albert E. Sebest, Irwin; Frank W. Smith, Pittsburgh, both of Pa.

[73] Assignee: Mine Safety Appliances Company, Pittsburgh, Pa.

[22] Filed: May 3, 1971

[21] Appl. No.: 139,671

[52] U.S. Cl. .................. 55/261, 55/267, 55/281, 55/316, 55/389, 55/486, 62/4, 128/191
[51] Int. Cl. ............................................. B01d 50/00
[58] Field of Search ..................................... 23/281; 128/140–142, 203, 191; 244/118; 62/4; 138/114, 149; 55/485, 316, 267, 486, 261, 387–389

[56] References Cited
UNITED STATES PATENTS

| | | | |
|---|---|---|---|
| 3,066,847 | 12/1962 | Fortune | 62/4 |
| 3,276,846 | 10/1966 | Moni et al. | 23/281 |
| 3,406,501 | 10/1968 | Watkins | 55/DIG. 30 |
| 3,547,161 | 12/1970 | Reece et al. | 138/114 |
| 3,565,068 | 2/1971 | Bickford | 23/281 |
| 3,573,001 | 3/1971 | Bovard | 23/281 |
| 3,580,250 | 5/1971 | Oroza | 23/281 |
| 3,655,346 | 4/1972 | Cotabish et al. | 23/281 |

FOREIGN PATENTS OR APPLICATIONS

| | | | |
|---|---|---|---|
| 451,170 | 7/1936 | Great Britain | 23/281 |

*Primary Examiner*—Bernard Nozick
*Attorney*—Brown, Murray, Flick & Peckham

[57] ABSTRACT

An oxygen producing candle is surrounded by a metal shell, which in turn is enclosed in a metal casing spaced from the shell. The unit is provided with an oxygen passage connecting the inside of the shell with the outside of the unit for delivery of oxygen therefrom. The space between the shell and casing is filled with a hydrated compound which will be dissociated by the heat from the burning candle and give off water vapor to limit the temperature of the casing to a safe level.

9 Claims, 3 Drawing Figures

PATENTED JUL 3 1973

3,742,683

INVENTORS.
ALBERT E. SEBEST
FRANK W. SMITH
BY
Brown, Murray, Flick & Peckham
ATTORNEYS.

OXYGEN PRODUCING UNIT WITH COOLED CASING

Oxygen producing units in which oxygen generating candles are burned are well known. Although there may be insulation between such a candle and the surrounding housing, very high temperatures are produced, in some cases as high as 500°F. This may not be objectionable in some cases, such as when the user will not come in contact with the unit. On the other hand, where the functioning oxygen producing unit is to worn or handled by an individual or is placed in contact with material that it may damage or set afire by extreme heat, high temperatures cannot be tolerated.

It is an object of this invention to provide an oxygen unit of the type discussed above in which its outer surface temperature is maintained low enough to be safe. Another object is to provide such a unit in which the oxygen that is produced is humidified.

Figure 1:
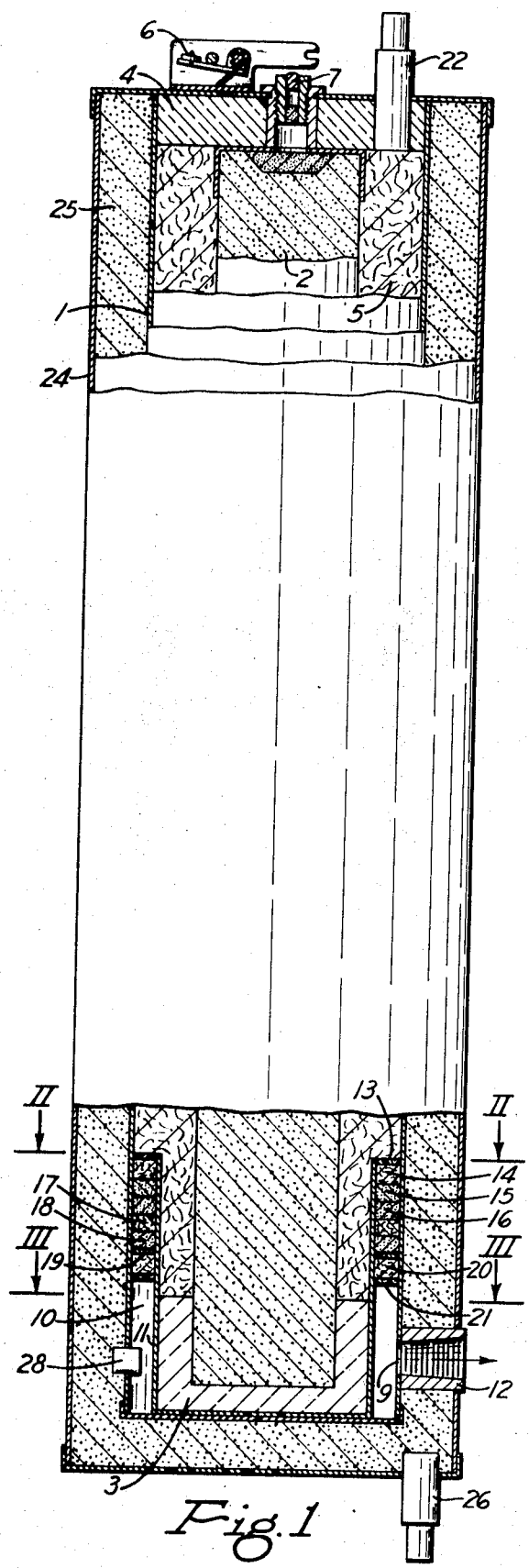
Figure 2:
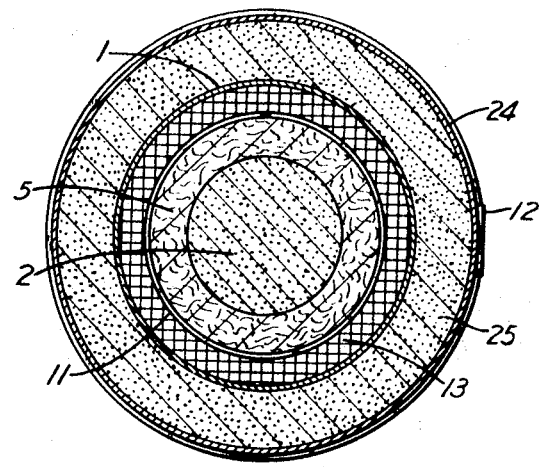
Figure 3:
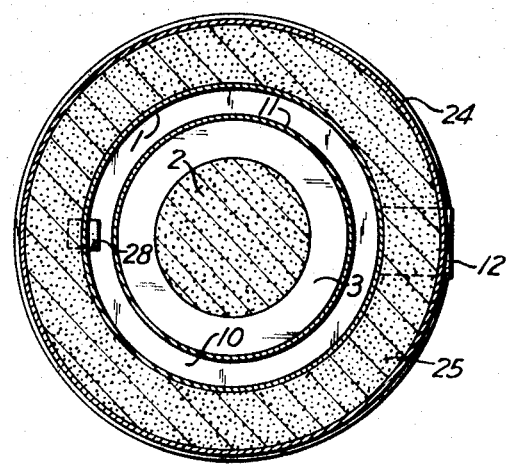

The preferred embodiment of the invention is illustrated in the accompanying drawings, in which FIG. 1 is a side view, partly in central longitudinal section; and FIGS. 2 and 3 are cross sections taken on the lines II—II and III—III, respectively, of FIG. 1.

Referring to the drawings, a long upright cylindrical metal shell 1, closed at its opposite ends, contains an oxygen producing candle 2 of well-known composition, such as sodium chlorate, glass fibers, iron and barium oxide. The candle is shorter than the shell and considerably smaller in diameter and is spaced from the shell by insulation. For example, the lower end of the candle may rest in a ceramic cup 3 and a ceramic disc 4 may be placed on top of the candle. The side of the candle is spaced from the surrounding housing by any suitable porous insulation 5, preferably, asbestos or ceramic fibers, that will withstand high temperatures. Mounted on top of the housing is the usual spring-actuated firing pin 6 which, when released, detonates an explosive charge 7 disposed in a passage through the top of the shell and the ceramic disc. The explosion ignites the candle, which then proceeds to generate oxygen.

Near the bottom of the shell it is provided with an outlet port 9 that communicates with an oxygen chamber 10 inside the shell. The inner wall of this chamber is formed from a metal sleeve 11 that encircles the ceramic cup and extends above it. The bottom of the sleeve is closed. The sleeve is spaced from the encircling shell to provide an annular space that forms the oxygen chamber. Oxygen liberated from the candle flows through the porous insulation 5 and enters the chamber 10 through the space between the shell and the upper edge of sleeve 11. The oxygen leaves the chamber through outlet port 9 and a tubular fitting 12, by which the port can be connected with a conduit for conducting the oxygen away.

In order to filter the oxygen and remove chlorine from it before it enters the oxygen chamber, filtering and chlorine removing annular members or rings encircle the upper portion of the metal sleeve 11. Preferably, these rings include in descending order a screen 13, a bed of heat-resistant fibers 14, a bed of soda lime 15, a molecular sieve 16, another bed of heat-resistant fibers 17, a bed of hopcalite 18, a screen 19, a third bed of heat-resistant fibers 20 and a bottom screen 21. Excessive oxygen pressure in the unit can be prevented by a relief valve 22 connected to the top of the shell and communicating with the upper end of the space between the candle and the side of the shell.

Although the insulation between the candle and the shell 1 around it will control the temperature of the shell to some extent, it still will be much too hot while the candle is burning. It is therefore a feature of this invention that provision is made for positively and automatically cooling the unit. Accordingly, the unit described thus far is enclosed in a casing 24 that is spaced from the shell. This spacing can be effected by extending the top of the shell radially outward and securing its outer edge to the upper end of the casing. The outer end of fitting 12 is sealed in an opening in the lower part of the casing. The space between the shell and casing is filled with a hydrated compound 25. Such compounds are well known. They contain combined water as water of crystallization. One such compound that is entirely satisfactory is aluminum sulfate, $Al_2(SO_4)_3 \cdot 18 H_2O$. The purpose of this material is to act as a source of water vapor that will limit the rise in temperature of the outer casing. When the hydrated compound is heated by the burning candle, it endothermically dissociates or dehydrates and liberates water vapor. This vapor or steam maintains the temperature of the casing between about 212°F and about 250°F. This temperature is low enough to permit the unit to be placed under aircraft seats, for example, without danger of damaging the materials engaging it or starting a fire. Excessive steam pressure is avoided by providing a relief valve 26 that has its inlet in the space between the shell and casing. This valve may be mounted in the bottom of the casing, for example.

The hydrated compound also can serve another purpose, which is to provide a source of water vapor for humidifying the oxygen in oxygen chamber 10. This can be accomplished by mounting a small pressure relief valve 28 in the wall of the shell, with its outlet in the oxygen chamber. When the steam pressure between the shell and casing rises to a predetermined value, steam will escape through this valve into the oxygen chamber where it will humidify the oxygen. The advantage of humidification is that it prevents the oxygen from drying the breathing passages of the user and causing irritation.

The outside temperature can be reduced still further by applying a layer of insulation to the outside of casing 24. Since heat generated by the candle is removed from the unit as sensible heat of the water vapor, this heat does not have to be dissipated through the outside insulation. In place of an outer layer of insulation, a perforated rigid shell could surround casing 24 at a distance therefrom, so that air would be free to circulate between the two.

The outer surface temperature also can be reduced below 212°F by using excess hydrated compound and replacing relief valve 26 with a vent. However, if this is done the weight of the unit will be increased due to the excess compound.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An oxygen unit comprising an oxygen producing candle, means at one end of the candle for igniting it, a metal shell surrounding the candle, a metal casing surrounding the shell, means spacing the casing from the shell to form a closed chamber between them, said igniting means extending through said casing, said unit being provided with an oxygen passage connecting the inside of the shell with the outside of the casing, and a hydrated compound filling the chamber between the shell and casing, which compound will be dissociated by the heat from the burning candle and will give off water vapor to hold down the temperature of the surrounding casing, and said chamber being provided with an outlet for said vapor directly to the atmosphere.

2. An oxygen unit according to claim 1, including a steam pressure relief valve secured to said casing and forming said chamber outlet.

3. An oxygen unit according to claim 1, including a relief valve connecting the space between said shell and casing with said oxygen passage to humidify oxygen in said passage.

4. An oxygen unit according to claim 1, including means in said passage for filtering and for removing chlorine.

5. An oxygen unit according to claim 4, in which said shell is spaced from the candle, a portion of said oxygen passage is inside the shell and encircles the candle, and said filtering and chlorine removing means are annular members encircling the candle, said members including in order a screen, a bed of heat-resistant fibers, a bed of soda lime, a molecular sieve, a bed of heat-resistant fibers, a bed of hopcalite, a screen, a bed of heat-resistant fibers, and a screen.

6. An oxygen unit according to claim 4, in which said shell is spaced from the candle, and a portion of said oxygen passage is inside the shell between it and a sleeve enclosing a portion of the candle, and said filtering and chlorine removing means are annular members encircling the candle and disposed in some of the space between the shell and sleeve.

7. An oxygen unit according to claim 6, in which said sleeve is spaced from the candle, and said unit includes insulation filling the space between the candle and the sleeve and shell.

8. An oxygen unit according to claim 1, in which said shell is spaced from the candle and including a sleeve inside the shell and surrounding the end of the candle opposite to its ignition end, the sleeve being closed at its outer end and spaced inwardly from the shell to form an oxygen chamber between them communicating with the space between the shell and candle, and filtering and chlorine removing means in the path of oxygen entering said chamber from between the candle and shell, said chamber having an outlet forming part of said oxygen passage.

9. An oxygen unit according to claim 8, in which said filtering and chlorine removing means are spaced from the outer end of the sleeve, and said chamber outlet is located between the outer end of the sleeve and said filtering means.

* * * * *